United States Patent [19]

Tanaka et al.

[11] 3,857,948

[45] Dec. 31, 1974

[54] SALINOMYCIN

[75] Inventors: Yoshiaki Tanaka; Hideo Saito, both of Tokyo; Yukio Miyazaki, Ageo; Hideo Sugawara, Saitama; Junsaku Nagatsu; Mitsuo Shibuya, both of Tokyo, all of Japan

[73] Assignee: Kaken Chemical Co., Ltd., Tokyo, Japan

[22] Filed: Oct. 26, 1973

[21] Appl. No.: 410,030

Related U.S. Application Data

[63] Continuation-in-part of Ser. No. 302,392, Oct. 31, 1972, abandoned.

[30] Foreign Application Priority Data

Mar. 3, 1972 Japan.............................. 47-21553

[52] U.S. Cl. .............................................. 424/283
[51] Int. Cl............................................ A61k 21/00
[58] Field of Search .................................. 424/283

[56] References Cited
OTHER PUBLICATIONS

Derwent, No. 76960T-BD, Abstracting JA-47-25392, published 10-20-72.

*Primary Examiner*—Jerome D. Goldberg
*Attorney, Agent, or Firm*—Oblon, Fisher, Spivak, McClelland & Maier

[57] ABSTRACT

Salinomycin, prepared by culturing *Streptomyces albus* has been found to be effective as an anticoccidium agent.

3 Claims, 2 Drawing Figures

SALINOMYCIN

RELATIONSHIP TO RELATED APPLICATIONS

This application is a continuation-in-part of application, Ser. No. 302,392, filed Oct. 31, 1972 now abandoned.

BACKGROUND OF THE INVENTION

This invention relates to Salinomycin. More particularly, it relates to an anticoccidium composition containing Salinomycin and an inactive carrier. Difficulty has arisen in the treatment of coccidium, especially as it occurs in fowls such as chickens, because of the development of strains resistant to treatment by conventional anticoccidium agents such as antithiamine and quinoline and sulfur containing agents. Therefore, a need exists for a new anticoccidium material for the treatment of resistant strains of coccidium.

SUMMARY OF THE INVENTION

Accordingly, it is an object of this invention to provide a preparation of Salinomycin from a Salinomycin producing microorganism.

It is another object of this invention to provide a new use of Salinomycin as an anticoccidium agent and to provide an anticoccidium composition.

This object and other objects of this invention, as hereinafter will be described, can be attained by culturing Streptomyces albus 80,614 to form Salinomycin in a medium, isolating the Salinomycin by solvent extraction of the mycelial cake and the filtrate of the liquid medium and purifying it. The isolated Salinomycin is used as an anticoccidium agent and is especially useful for preventive and therapeutic treatment of fowls (chickens).

DESCRIPTION OF THE PREFERRED EMBODIMENTS

Figure 1:
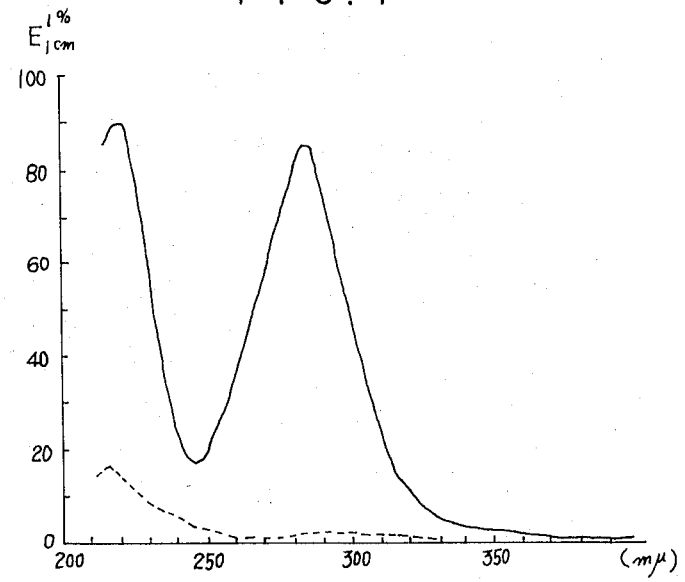
FIG. 1 is an ultraviolet spectrum of Salinomycin in 0.01 N HCl,–methanol solution (undotted line) and 0.01 N NaOH–methanol solution (dotted line); and, FIG. 2 is an infrared spectrum of Salinomycin.

Salinomycin can be successfully isolated from a fungus body and medium, which is cultured from a Salinomycin producing Streptomyces albus microorganism, Streptomyces albus 80,614 (Fermentation Research Institute of the Agency of Industrial Science and Technology of Japan No. 419) ATCC 21,838.

Streptomyces albus 80,614 can be cultured by the same process employed for Actinomycetes. For industrial operations, a stirred aerobic culture process is preferred. The temperature of the culture is preferably maintained from 25°C. to 30°C., and the culture medium can be any of the usual ones used for culturing Actinomycetes. The culture medium comprises a carbon source, a nitrogen source, inorganic salts, a small amount of an organic component and an anti-foaming agent. The highest accumulation of Salinomycin in the culture can be found in a period from 72 – 120 hours after the initiation of culture.

Isolation of Salinomycin can be accomplished by utilizing a characteristic of Salinomycin. Salinomycin is soluble in various organic solvents and can be isolated by a solvent extraction process. After an appropriate culturing period of Actinomycetes, the culture is filtered and separated into a mycelial cake and a filtrate, both of which contain Salinomycin. The cake is treated with a solvent selected from the group consisting of butylacetate, acetone and chloroform, whereby the fungus body is autolyzed and the Salinomycin in the fungus body is extracted. After combining the filtrate and the extract phase, the solution containing Salinomycin is concentrated in vacuum and is purified in a chromatographic column over alumina. The Salinomycin extract is eluted through the column with either ethyl acetate, hexane or a mixture thereof. The eluent is fractioned to yield fractions with a high antibiotic action. These fractions are concentrated in a vacuum and purified through a column chromatograph containing a gel filtering material, Sephadex LH–20. In this instance, Salinomycin is eluted through the column with acetone. The eluate is fractionated to collect active fractions which are concentrated to yield powdery, purified Salinomycin. Streptomyces albus 80,614 has a long hypha which is not separated into a bacillary or a coccoid. The aerial mycelium of Streptomyces albus 80,614 is substantially straight, but sometimes diverges to yield sporephores possessing 2 – 3 turns in a spiral form. The surface of the spore is smooth and it has no spine. The spore possesses a long ellipsoid or cylindrical shape of about $0.5 – 1.0\mu \times 1.0 – 1.5\mu$ in size.

The characteristics of Streptomyces albus 80,614 are as follows:

Physiological reactions of Streptomyces albus 80,614

| Test | Response |
| --- | --- |
| Milk coagulation | Negative |
| Milk peptonization | Negative |
| Melanin formation | Negative |
| Tyrosinase reaction | Negative |
| Nitrate reduction | Positive, sometimes negative |
| Starch hydrolysis | Positive |
| Liquefaction of gelation | Positive |
| Decomposition of cellulose | Negative |
| Chromogenicity | Negative |
| Oxygen requirement | Aerobic |
| Optimum growing conditions | pH 5.5 – 8.2 temperature 21 – 37°C. |

Utilization pattern of carbon sources by Streptomyces albus 80,614
(Pridham & Gottlieb's basal medium)
++: glucose, fructose, galactose, mannitol, xylose, cellobiose, mebibiose, inulin
+: lactose, trehalose, starch
±: maltose, mannose, sucrose, salicin, arabinose
—: melezitose, inositol, dulcitol, sorbitol, raffinose, adonitol, rhamnose
++: strongly positive
+: positive
±: doubtfully positive
—: negative The physico-chemical properties of Salinomycin (Na salt) are as follows:

1. Colorless, weak acidic powder:
Melting point 117° – 118°C.

2. Optical rotation:
$[\alpha]_D^{20} = -25°$ ($c = 1$, methanol)

3. Solubility: soluble in alcohols, esters, chloroform, ether, carbon tetrachloride and hexane; insoluble in water.

4. Stability: stable at pH 7 – 9; slightly unstable at a pH lower than 5.

5. Color reaction:
Negative for the Lemieux reaction, potassium permanganate reaction, ninhydrin reaction, ferric chloride reaction and Fehling's reaction; a positive reddish-brown color for the iodine reaction;

7 Ultraviolet spectrum:
The undotted line of FIG. 1 represents the spectrum of Salinomycin measured in 0.01 N – HCl methanol solution, and the dotted line represents the spectrum measured in 0.01 N – NaOH methanol solution.

Figure 2:
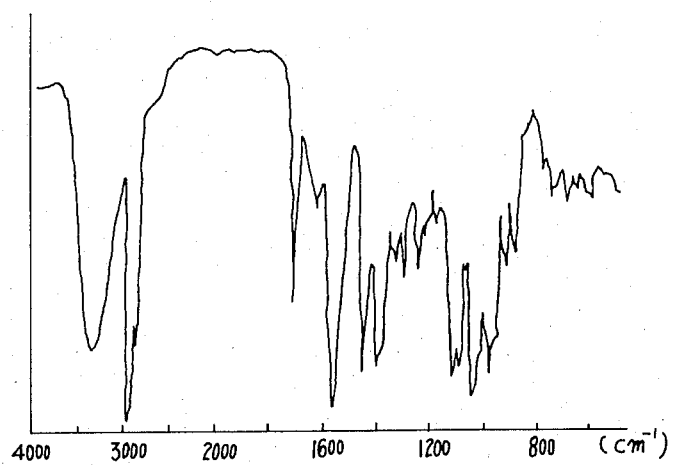

8. Infrared absorption spectrum:
See FIG. 2.

9 Antimicrobial spectra:
The minimum inhibitory concentration (mcg/ml) is stated in the Table.

| | |
|---|---|
| Bacillus subtilis | 2.0 |
| Bacillus cercus | 2.0 |
| Bacillus circulans | 4.0 |
| Bacillus megaterium | > 100 |
| Staphylococcus aureus | 2.0 |
| Staphylococcus epidermidis | 4.0 |
| Sarcina Lutea | 8.0 |
| Micrococcus flavus | 8.0 |
| Micrococcus luteus | 4.0 |
| Mycobacterium smegmatis ATCC 607 | 8.0 |
| Mycobacterium phlei | 4.0 |
| Mycobacterium avium | 8.0 |
| Escherichia coli | > 100 |
| Klebsiella pneumoniae | > 100 |
| Proteus vulgaris | > 100 |
| Xanthomonas oryzae | 64 |
| Psendomonas aeruginosa | > 100 |
| Piricularia oryzae | 16 |
| Alternaria kikuchiana | 32 |

Duamycin, K–178, K–358, X–206, nigericin, Monensin A.B.C, and Dianemycin, and the like have certain characteristics similar to those of Salinomycin. As expected, these antibiotics have different melting points, infrared spectra and elimentary analysis values. Salinomycin has ultraviolet absorption maxima at 220 m$\mu$ and 285 m$\mu$, when its spectrum is measured in an acidic methanol solution.

The Salinomycin of this invention has the formula, in acid form:

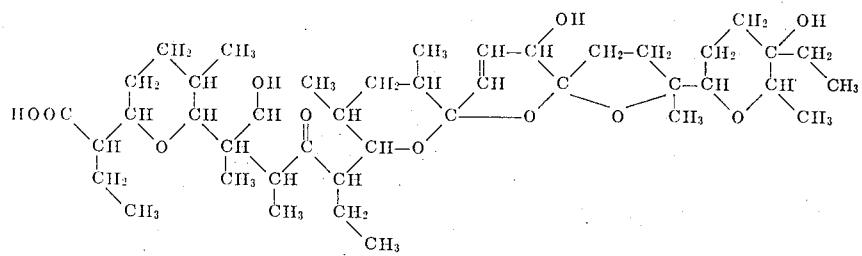

which may be present in the form of a pharmaceutically acceptable salt or ester thereof. Suitable pharmaceutically acceptable salts are the salts of sodium, potassium, calcium, magnesium or ammonium. Suitable esters are the lower alkyl esters ($C_{1-6}$) or benzyl ester.

$C_{42}H_{69}O_{11}Na$ (molecular weight 772) (Na-type)

$C_{42}H_{70}O_{11}$ (molecular weight 750) (H-type)

Preparation of Salinomycin

*Streptomyces albus* 80614 (ATCC 21,838) (FERM-P No. 419) was inoculated into 100 liters of a liquid medium containing 2% glucose, 1% starch, 2.5% soybean flour, 0.2% beer yeast, 0.2% meat extract and 0.2% sodium chloride, in a 200 liter stainless steel tank at pH 7.0. The mixture was cultured at 27°C. for 84 hours under aerobic conditions. Air was passed into the culture at the rate of 100 liter/min. with stirring at the rate of 250 rpm. Upon termination of the culturing period, the resulting product was adjusted to pH 8 by the addition of NaOH, and further admixed with 2% diatomaceous earth and filtered. An 83 liter quantity of the filtrate was admixed with 50 liters of butyl acetate, and extracted two times. In addition, the fungus body was extracted with 30 liters of 70% acetone. The acetone solution was concentrated in a vacuum and extracted with 10 liters of butyl acetate after removing the acetone. The butyl acetate was added to the filtrate and the mixture was washed with water and concentrated in a vacuum to a 0.4 liter volume. The concentrated solution was passed through a column packed with 3 liters of activated alumina to adsorb the components. A mixture of ethyl acetate and n-hexane (4 : 1) was passed through the column to elute the adsorbed material, and the eluted fractions containing the active component were concentrated in a vacuum. The concentrated solution was purified by a chromatographic column packed with Sephadex LH–20 in which acetone was used as the eluting solution. The chromatographic treatment was repeated twice to yield 8.5 g. of pure, white powdery Salinomycin.

Use of Salinomycin

Salinomycin has been found to be an effective treatment for anticoccidium, especially as found in fowls (chickens). Serious problems have evolved in the prevention of coccidium in fowls (chickens), because of the development of strains resistant to conventional anti-coccidium agents, such as anti-thiamine, and quinoline and sulfur containing agents. Salinomycin has been found to be effective in the prevention and therapeutic treatment of resistant and sensitive strains of coccidium.

The anti-coccidium composition of the invention is preferably prepared as a concentrated composition by admixing Salinomycin with a physiological non-toxic solid or liquid carrier to form a concentrate which can be added to the food and drink of fowls (chickens). Suitable solid carriers include wheat flour, soybean flour, rice, deoiled bran, talc, kaolin, chalk and diatomaceous earth. Suitable liquid carriers include physiological salt solutions, distilled water and physiological non-toxic organic solvents and the like. Other suitable additives include emulsifiers, dispersing agents, suspending agents, wetting agents, concentration agents, gelation agents, and active ingredients including adhering accelerators such as soybean oil.

The anti-coccidium composition is preferably administered as a solid, and as previously mentioned, the carrier for the composition can be an organic or an inorganic feed stuff. The active ingredient or composition is mixed by stirring, shaking or crushing with growth promoting feed-stuffs or feed-stuffs for layers or broilers (chickens) to form a powdery concentrate containing a physiologically non-toxic carrier. If the anti-coccidium composition is used as a liquid for oral doses, Salimonycin is preferably dispersed in a physiologically non-toxic carrier such as water. Other anti-coccidium ingredients may be added to the composition in addition to a bird growth promoting ingredient and a growth promoting ingredient for chicken eggs. Preferably, the anti-coccidium composition contains more than about 0.0001% by weight Salinomycin.

The amount of Salinomycin required for the preventive and therapeutic treatment of coccidium in fowls (chickens), can be in the range from 0.001 – 0.05% by weight. Coccidium is caused by *Eimeria tanella* and effective preventive and therapeutic treatment of the disease can be achieved by using Salinomycin as follows.

Test 1

A group of the Highline species of male chickens resistant to 40 ppm of methylbenzoquate was infected with the oocyst of *Eimeria tenella* in amounts of $7.2 \times 10^4$ portions of oocyst per chicken. The infected chickens (14 days newborn) were separated into two groups. The feed-stuff shown in Table I was admixed with 0.01% of the Salinomycin diluted with soybean meal. The treated meal was fed to the first group of chickens, while the second group of chickens was left untreated.

TABLE I

| Formula of feed-stuff (%) | |
|---|---|
| corn flour | 41.81 |
| TC feed-stuff (wheat flour 85%) | |
| (tallow 15%) | 25 |
| soybean meal | 20 |
| fish meal with solubles | 8 |
| Alfalfa meal | 3 |
| tricalcium phosphate | 1 |
| calcium carbonate | 0.3 |
| salt | 0.45 |
| Vitamins A, D and E | 0.05 |
| Group B vitamins | 0.1 |
| inorganic component | 0.1 |
| methionin | 0.05 |
| soybean meal premixed with drug | 0.14 |
| | 100 |

Doses of Salinomycin were continuously applied to the first group of chickens from the day prior to infection with the oocyst to the end of the test. The oocyst was injected 15 days after the birth of the chickens. All of the infected chickens were dissected 9 days after inoculation. The test results are shown in Tables II and III.

a. Weight increase rate and mortality rate (death rate).

The weights of the chickens were measured at the time of inoculation and at the end of the test. Weight increase rates were calculated with the first weight designated as 100.

b. O.P.G. (oocyst per gram of dung)

The O.P.G. was calculated from the Plankton's counting board by observing the feces 7 days after inoculation.

c. Condition of feces

The condition of feces was observed both morning and evening.

d. Dissection

The disease of the intestine was observed and the number of oocysts in the duodenum, jejunum, small intestine, and caecum were investigated. The numerals shown in Table III represent the number of infected chickens, while the symbols − to ++++ correspond to the following conditions.

− Caecum is normal

+ Shape of the caecum is normal.
  Content of the caecum is slightly fluid and yellowish.
  Muscosol of the caecum is partially dilated and is white.

++ Shape of the caecum is substantially normal.
  Mucusa of the caecum is dilated over all of its surface.
  No blood is found in the caecum.
  Mucous is yellowish.
  A small number of white dead spots and bleeding spots are found in the mucosa of the caecum.

+++ Atrophy and deformation of the caecum are clearly found, and the length of the caecum is slightly longer than the rectum. Normal content of the caecum is not found, and the caecum is filled with blood clots or a gray cheese-like degenerated material. Incrassation of the caecum is remarkable and it is breakable. Bleeding spots are sometimes found. Disease reaches the base of the caecum but not to the rectum.

++++ Atrophy and deformation of the caecum are clearly found. In general, the caecum is sausage-shaped and its length is the same or shorter than the rectum. The disease reaches into one-third to one-fourth of the rectum. The other observations made are the same as those of +++.

TABLE II

| Group | number | weight increase rate (%) | mortality (death rate) (%) | O.P.G. (× 10⁴) 7 days evening | O.P.G. (× 10⁴) 8 days evening | O.P.G. (× 10⁴) 9 days morning | Condition of feces |
|---|---|---|---|---|---|---|---|
| First group (Salinomycin) | 11 | 106.4 | 8 | 0 | 0 | 0.32 | normal feces (bloody feces were found for one but the chicken recovered) |
| Second group (No Salinomycin) | 10 | 91.2 | 70 | 18.24 | 14.88 | 0.32 | soft feces were found in all after 7 days with bloody feces in about 80% of the chickens. |

TABLE III

Dissecton of chickens (except those that died)

| Group | Number | disease of caecum | | | | Number of oocysts | | | | disease of the intestine other then the caecum |
|---|---|---|---|---|---|---|---|---|---|---|
| | | − | + | ++ | +++ | − | + | ++ | +++ | |
| First group (Salinomycin) | 10 | 9 | 1 | 0 | 0 | 8 | 2 | 0 | 0 | none |
| Second group (No Salinomycin) | 3 | 0 | 0 | 0 | 3 | 0 | 0 | 1 | 2 | none |

Note: In Table III the disease of caecum columns show +, ++, +++ (three subcolumns after −), with only three values shown for second group in +++ column as "3". (Reading: First group: −=9, +=1, ++=0, +++=0; then oocysts +=0, ++=8, +++=2, ++++=0, 0. Second group: −=3 ... see image.)

Salinomycin exhibited excellent therapeutic effects, as shown by the conditions of the feces, O.P.G. weight increase rate, death rate and dissection observations of the Salinomycin dosed group.

Test 2

A group of the White Leghorn species of newborn chickens was infected with the oocyst of *Eimeria tenella* in amounts of $5 \times 10^4$ portions of the oocyst per chicken. The chickens (21 days newborn) were separated into four groups. The feed-stuff shown in Table I was admixed with Salinomycin, and 0.001% Salinomycin was continuously administered to the first group starting from 5 days prior to the inoculation of the oocyst. 0.01% Salinomycin was continuously administered to the second group starting with the inoculation date. A 0.01% quantity of commercially available antithiamine (Amprolium) (1-[(4-amino-2-propyl-5-pyrimidinyl)methyl]-2-picolinium chloride.) was continuously administered to the third group starting from 5 days prior to infection with the oocyst. No drug was administered to the fourth group, which acted as the control group. Each group of chickens was infected with the oocyst 21 days from birth. All of the infected chickens were dissected 7 days after the inoculation. The test results are shown in Tables IV and V. The tests were the same as those summarized in Table I, and the numerals and symbols are the same as those of Test 1.

TABLE IV

| Group | Number | Amount of active ingredient (%) | Weight increase rate (%) | mortality (death rate) (%) | O.P.G. (7 days) | Condition of feces |
|---|---|---|---|---|---|---|
| First group (Salinomycin administered prior to inoculation) | 10 | 0.001 | 144.8 | 0 | 0 | Normal feces (meaty feces were found in one) |
| Second group (Salinomycin administered from inoculation) | 10 | 0.01 | 144.4 | 0 | 0 | Normal feces |
| Third group (Reference) | 10 | 0.01 | 137.7 | 20 | $2.1 \times 10^3$ | Bloody feces were found in two |
| Fourth group (Control) | 10 | — | 135.2 | 60 | $11.8 \times 10^4$ | Bloody and meaty feces were found in all |

TABLE V

| Group | Number | disease of caecum | | | | | disease of the intestine other than the caecum |
|---|---|---|---|---|---|---|---|
| | | − | + | ++ | +++ | ++++ | |
| First group | 10 | 9 | 1 | 0 | 0 | 0 | none |
| Second group | 10 | 8 | 2 | 0 | 0 | 0 | none |
| Third group | 8 | 3 | 3 | 2 | 0 | 0 | none |
| Fourth group | 4 | 0 | 0 | 1 | 3 | 0 | none |

Test 3

In accordance with the method of Test 1, the oocyst was administered to each group at various concentrations of Salinomycin. The results are shown in Table VI, together with the references. Age of the birds was 4 weeks old.

TABLE VI

The effects of various concentrations of Salinomycin against infection with *E.tenella*

| Group No. | Drug | concentration of drug in feed (ppm) | No. of infected oocysts | Duration of medication (days) | No. of birds | No. of dead birds | O.P.G.* |
|---|---|---|---|---|---|---|---|
| 1 | Salinomycin | 1 | 5 × 10⁴ | 8 | 10 | 4 | 3.3 × 10⁶ |
| 2 | do. | 10 | do. | do. | 10 | 5 | 7.8 × 10⁶ |
| 3 | do. | 50 | do. | do. | 10 | 4 | 7.3 × 10⁵ |
| 4 | do. | 75 | do. | do. | 10 | 0 | 5.8 × 10⁵ |
| 5 | do. | 100 | do. | do. | 10 | 0 | 1.0 × 10⁵ |
| 6 | do. | 125 | do. | do. | 10 | 0 | 8.7 × 10³ |
| 7 | clopidol | 125 | do. | do. | 10 | 0 | 5.8 × 10³ |
| 8 | infected control | — | do. | do. | 10 | 7 | 7.9 × 10⁶ |
| 9 | uninfected control | — | do. | do. | 10 | 0 | 0 |

*Daily oocyst counting was done for 8 days after the infection, and the results are expressed as the number of oocysts per gram of feces. The figures shown present the maximum daily oocyst count.

TABLE VI

| Group No. | cecal lesion | | | | |
|---|---|---|---|---|---|
| | − | + | ++ | +++ | ++++ |
| 1 | | | 3 | 3 | 4 |
| 2 | | 1 | 3 | 2 | 5 |
| 3 | | | 2 | 4 | 4 |
| 4 | 5 | 3 | 2 | | |
| 5 | 6 | 4 | | | |
| 6 | 8 | 2 | | | |
| 7 | 6 | 4 | | | |
| 8 | | | 1 | 2 | 7 |
| 9 | 10 | | | | |

Salinomycin exhibited excellent therapeutic effects in combatting coccidium as shown by the conditions of the feces, O.P.G. weight increase rate, death rate and dissection observations of the Salinomycin dosed group in comparison to the group dosed with the known anti-coccidium agent indicated.

Having now fully described the invention, it will be apparent to one of ordinary skill in the art that many changes and modifications can be made thereto without departing from the spirit or scope of the invention as set forth herein.

Accordingly, what is claimed as new and intended to be covered by Letters Patent is:

1. An anti-coccidium composition which comprises an effective amount for treating coccidium of a Salinomycin having the formula in acid form of:

and a pharmaceutical carrier.

2. The anti-coccidium composition of claim 1, which comprises an effective amount for treating coccidium of said Salinomycin and feed-stuff for fowl.

3. A process for treating coccidium in fowl which comprises treating said infected fowl with an effective amount of a Salinomycin sufficient to treat coccidium and a pharmaceutical carrier, wherein said Salinomycin has the formula, in acid form of:

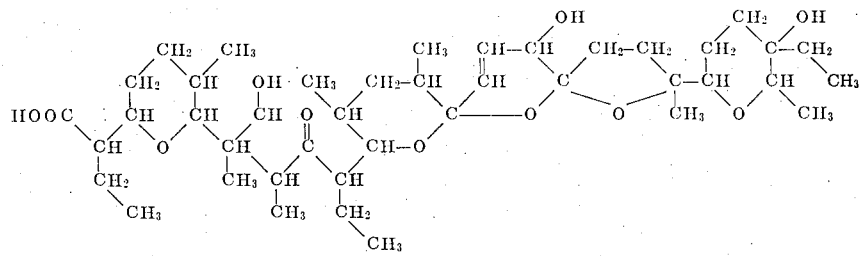

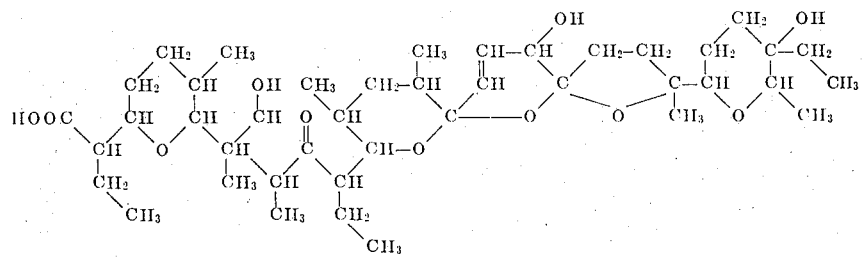

* * * * *